United States Patent
Imbrenda et al.

(10) Patent No.: US 11,347,529 B2
(45) Date of Patent: May 31, 2022

(54) INJECT INTERRUPTS AND EXCEPTIONS INTO SECURE VIRTUAL MACHINE

(71) Applicant: INTERNATIONAL BUSINESS MACHINES CORPORATION, Armonk, NY (US)

(72) Inventors: Claudio Imbrenda, Boeblingen (DE); Fadi Y. Busaba, Poughkeepsie, NY (US); Lisa Cranton Heller, Rhinebeck, NY (US); Jonathan D. Bradbury, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/296,332

(22) Filed: Mar. 8, 2019

(65) Prior Publication Data
US 2020/0285495 A1    Sep. 10, 2020

(51) Int. Cl.
*G06F 9/455* (2018.01)
*G06F 9/38* (2018.01)
*G06F 9/48* (2006.01)

(52) U.S. Cl.
CPC ........ *G06F 9/45545* (2013.01); *G06F 9/3865* (2013.01); *G06F 9/45558* (2013.01); *G06F 9/4812* (2013.01); *G06F 2009/45562* (2013.01); *G06F 2009/45587* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 5,896,499 | A | 4/1999 | McKelvey |
| 7,725,559 | B2 | 5/2010 | Landis et al. |
| 7,984,108 | B2 | 7/2011 | Landis et al. |

(Continued)

FOREIGN PATENT DOCUMENTS

| | | |
|---|---|---|
| CN | 102811239 A | 12/2012 |
| CN | 105184147 A | 12/2015 |

(Continued)

OTHER PUBLICATIONS

Futagami, "Secure Out-of-band Remote Management of Virtual Machines with Transparent Passthrough" 2018, ACM (Year: 2018).*

(Continued)

*Primary Examiner* — Wynuel S Aquino
(74) *Attorney, Agent, or Firm* — Cantor Colburn LLP; Edward Wixted

(57) ABSTRACT

According to one or more embodiments of the present invention, a computer implemented method includes initiating, by a non-secure entity that is executing on a host server, a secure entity, the non-secure entity prohibited from directly accessing any data of the secure entity. The method further includes injecting, into the secure entity, an interrupt that is generated by the host server. The injecting includes adding, by the non-secure entity, information about the interrupt into a portion of non-secure storage, which is then associated with the secure entity. The injecting further includes injecting, by a secure interface control of the host server, the interrupt into the secure entity.

14 Claims, 6 Drawing Sheets

(56) References Cited

U.S. PATENT DOCUMENTS

| | | | |
|---|---|---|---|
| 8,370,641 | B2 | 2/2013 | Henry et al. |
| 8,656,482 | B1* | 2/2014 | Tosa .................. H04L 63/08 713/153 |
| 9,436,576 | B2 | 9/2016 | Zhu et al. |
| 9,483,639 | B2 | 11/2016 | Sliwa et al. |
| 9,672,058 | B2 | 6/2017 | Sliwa et al. |
| 9,792,143 | B1 | 10/2017 | Potlapally et al. |
| 9,948,640 | B2 | 4/2018 | Ignatchenko et al. |
| 2008/0059556 | A1 | 3/2008 | Greenspan et al. |
| 2010/0017840 | A1* | 1/2010 | Akins, III ............ H04N 7/1675 725/131 |
| 2010/0115291 | A1 | 5/2010 | Buer |
| 2011/0029974 | A1 | 2/2011 | Broyles et al. |
| 2011/0271279 | A1 | 11/2011 | Pate |
| 2011/0302400 | A1 | 12/2011 | Maino et al. |
| 2013/0339630 | A1* | 12/2013 | Alexander .......... G06F 12/0808 711/144 |
| 2015/0127866 | A1* | 5/2015 | Zeng .................. G06F 13/24 710/264 |
| 2015/0277947 | A1 | 10/2015 | Busaba et al. |
| 2016/0085568 | A1 | 3/2016 | Dupre et al. |
| 2016/0132345 | A1 | 5/2016 | Bacher et al. |
| 2017/0177398 | A1 | 6/2017 | Bacher |
| 2017/0351601 | A1* | 12/2017 | Matsuzawa ........ G06F 12/0638 |
| 2018/0165224 | A1 | 6/2018 | Brown et al. |
| 2018/0173645 | A1 | 6/2018 | Parker |
| 2018/0247082 | A1* | 8/2018 | Durham .............. G06F 9/45533 |
| 2018/0330081 | A1* | 11/2018 | Hua ...................... G06F 9/4812 |
| 2020/0117624 | A1* | 4/2020 | Kumar ................. G06F 9/4411 |
| 2020/0134171 | A1* | 4/2020 | Li ......................... G06F 21/51 |
| 2020/0249983 | A1* | 8/2020 | Wang ................... G06F 9/45558 |
| 2020/0285493 | A1 | 9/2020 | Heller |
| 2020/0285499 | A1 | 9/2020 | Heller |
| 2020/0285501 | A1 | 9/2020 | Heller |
| 2020/0285518 | A1 | 9/2020 | Bacher |
| 2020/0285589 | A1 | 9/2020 | Imbrenda |
| 2020/0285594 | A1 | 9/2020 | Busaba |
| 2020/0285595 | A1 | 9/2020 | Bradbury |
| 2020/0285758 | A1 | 9/2020 | Schwidefsky |
| 2020/0285762 | A1 | 9/2020 | Bradbury |
| 2020/0285777 | A1 | 9/2020 | Heller |
| 2020/0287709 | A1 | 9/2020 | Bradbury |
| 2020/0287902 | A1 | 9/2020 | Heller |

FOREIGN PATENT DOCUMENTS

| | | |
|---|---|---|
| CN | 105184164 A | 12/2015 |
| GB | 2539436 B | 2/2019 |
| KR | 20130000253 A | 1/2013 |
| TW | 453672 B | 9/2014 |
| TW | 201710912 A | 3/2017 |
| WO | 2014081611 A3 | 5/2014 |
| WO | 2019070675 A1 | 4/2019 |

OTHER PUBLICATIONS

Richard Boivie, "Hardware Support for Malware Defense and End-toEnd Trust", Feb. 2017, International Business Machines Corporation (IBM) (Year: 2017).*

"System and Method of Identifying a Hypervisor Configuration Using Exposed Application Programming Interfaces to Seed a Results Engine"; IP.com No. IPCOM000234597D; IP.com Publication Date: Jan. 21, 2014; 8 Pages.

"Virtualisation of Embedded SW Components for Protection, Control and Monitoring Systems in Electrical Power Networks"; IP.com No. IPCPM000176089D; IP.com Publication Date: Nov. 5, 2008; 4 Pages.

Boivie et al.; Hardware Support for Malware Defense and End-to-End Trust; International Business Machines Corporation TJ Watson Research Center Yorktown Heights United States; 2017; 81 Pages.

Borntraeger et al., "Secure Interface Control High-Level Instruction Interception for Interruption Enablement," U.S. Appl. No. 16/296,452, filed Mar. 8, 2019.

Burtsev; "CS5460/6460: Operating Systems—Lecture 6: Interrupts and Exceptions"; Jan. 2014; 36 Pages.

Busaba et al., "Transparent Interpretation of Guest Instructions in Secure Virtual Machine Environment," U.S. Appl. No. 16/296,316, filed Mar. 8, 2019.

Disclosed Anonymously; "System and Method for Segmenting a VM into Logical Security Zones"; IP.com No. IPCOM000232145D; IP.com Publication Date: Oct. 21, 2013; 5 Pages.

Disclosed Anonymously; "System and Method to Secure Virtual Machines in a Cloud Deployment"; IP.com No. IPCOM000250505D; IP.com Publication Date: Jul. 26, 2017; 4 Pages.

Li et al.; "Secure Virtual Machine Execution Under an Untrusted Management OS"; 2010 IEEE 3rd International Conference on Cloud Computing; IEEE; 2010; pp. 172-179.

List of IBM Patents or Patent Applictions Treated as Related; Appendix P; Date Filed Jun. 20, 2019; 2 Pages.

Siemens et al.; "Method of Saving and Restoring the State of a Virtual Machine Guest Controller Software in Case of Failure/Crash or User Request"; IP.com No. IPCOM000205582D; IP.com Publication Date: Mar. 31, 2011; 5 Pages.

Yakovlev; "Hypervisor Security"; DEFCON NN; 2017; pp. 1-46.

Abel Gordon et al: "ELI", Proceedings of the 7th International Conference on Architectural Support for Programming Languages and Operating Systems, ASPLOS'12, Mar. 3-7, 2012, p. 411.

International Search Report; International Application No. PCT/EP2020/055127; International Filing Date: Feb. 27, 2020; dated May 15, 2020; 9 pages.

Zhang Wang et al: "A survey of direct interrupt delivery techniques in I/O virtualizaiton", 2017 8th IEEE International Conference on Software Engineering and Service Science (ICSESS), IEEE, Nov. 24, 2017 (Nov. 24, 2017), pp. 169-172, XP033333610, DOI: 10.1109/ICSESS.2017.8342889 [retrieved on Apr. 19, 2018] p. 169-p. 170.

International Search Report; International Application No. PCT/IB2020/051667; International Filing Date: Feb. 27, 2020; dated Jun. 4, 2020; 9 pages.

Gordon et al.; "ELI: Bare-Metal Performance for I/O Virtualization"; Proceedings of the Seventeenth International Conference of Artitectural Support for Programming Languages and Operating Systems, Asplos XVII, Mar. 3-7, 2012, 12 pages.

International Search Report; International Application No. P201809776PCT01; International Filing Date: Feb. 27, 2020; dated May 15, 2020; 3 pages.

International Search Report; International Application No. 109104690; International Filing Date: Feb. 14, 2019; dated Oct. 21, 2021; 4 pages.

* cited by examiner

INJECT INTERRUPTS AND EXCEPTIONS INTO SECURE VIRTUAL MACHINE

BACKGROUND

The present application relates to computer technology, and more specifically, to virtual machines or containers.

Cloud computing facilitates the ability to provision a virtual machine for a customer quickly and easily, without requiring the customer to purchase hardware or provide floor space for a physical server. The customer may expand or contract the virtual machine according to changing preference(s). Typically, the cloud computing provider provisions the virtual machine, which is physically resident at the provider's datacenter. In this environment, the customer's virtual machine is running as a guest and the cloud provider uses hypervisor code running as a host to virtualize the server resources between multiple virtual machines, possibly belonging to different customers.

Customers are often concerned about the security of data in the virtual machine. The customer may desire security between its code and data and the cloud computing provider or between its data as well as between its code and data and from other VMs running at the provider's site. Security from the provider's administrators as well as against potential security breaches in other code (including hypervisor code) running on the machine can be desired by the customer. These administrators and other code may be acting with malicious intent.

In general, a VM, running as a guest under the control of a host hypervisor, relies on that hypervisor to transparently provide virtualization services for that guest. These services include memory management, instruction emulation, and interruption processing.

SUMMARY

According to one or more embodiments of the present invention, a computer implemented method includes initiating, by a non-secure entity that is executing on a host server, a secure entity, the non-secure entity prohibited from directly accessing any data of the secure entity that the secure entity has not explicitly shared. The method further includes injecting, into the secure entity, an interrupt that is generated by the host server. The injecting includes adding, by the non-secure entity, information about the interrupt into a portion of non-secure storage, which is associated with the secure entity. The injecting further includes injecting, by a secure interface control of the host server, the interrupt into the secure entity. In one or more examples, the secure entity is a secure virtual machine, container or guest. In one or more examples, the non-secure entity is a hypervisor, OS or host.

According to one or more embodiments of the present invention, the method further includes prior to the injecting, determining, by the secure interface control, whether the interrupt is permitted to be injected into the secure entity, wherein the injecting is performed based on determining that the interrupt is permitted to be injected into the secure entity. In one or more examples, the secure interface control determines that the interrupt is permitted to be injected into the secure entity based on a predetermined list of permissible interrupts for the secure entity. The list of permissible interrupts is specific to said secure entity.

According to one or more embodiments of the present invention the information about the interrupt comprises an identifier for the interrupt to be injected and one or more parameters associated with the interrupt. In one or more examples, the method further includes prior to the injecting, determining, by the secure interface control, whether the interrupt and the one or more parameters are permitted to be injected into the secure entity, wherein the injecting is performed based on determining that the interrupt and the one or more parameters are permitted to be injected into the secure entity.

In one or more examples, the method further includes, prior to injecting by the non-secure entity, undispatching a processor associated with the secure entity. Further, after adding the information about the interrupt by the non-secure entity, redispatching a virtual processor to resume operation of the secure entity.

According to one or more embodiments of the present invention, the method further includes, in response to determining that the interrupt is not permitted to be injected into the secure entity, indicating an error to the non-secure entity by the secure interface control.

According to one or more embodiments of the present invention, the secure interface control comprises hardware, millicode and other trusted firmware.

Additionally, according to one or more embodiments of the present invention a computer-implemented method includes executing, by a secure entity that is executing on a non-secure entity on a host server, an instruction that generates a condition that is to be forwarded to the non-secure entity, the non-secure entity prohibited from directly accessing any data of the secure entity that the secure entity has not explicitly shared. The method further includes undispatching the processor associated with the secure entity that executed the instruction, the non-secure entity then emulating the instruction. The method further includes determining, by the non-secure entity whether an interruption or program exception should be delivered to the secure entity, and based on such determination injecting, into the non-secure entity, the interrupt or program exception into the secure entity. Injecting the interrupt includes, based on the interrupt or program exception being raised by the emulation of the instruction, adding, by the non-secure entity, information about the interrupt or program exception to a portion of non-secure storage, which is associated with the secure entity. Injecting the interrupt further includes resuming the processor associated with the secure entity to resume operation of the secure entity.

According to one or more embodiments of the present invention, the method further includes prior to the injecting, determining, by the secure interface control, whether the program exception is valid for injection into the secure entity, wherein the injecting is performed based on determining that the program exception is valid for injection into the secure entity. In one or more examples, the secure interface control determines that the program exception is valid based on a predetermined list of exceptions corresponding to the instruction. In one or more examples, the information about the program exception comprises an identifier for the program exception to be injected and one or more parameters associated with the program exception.

The above described features can also be provided at least by a system, a computer program product, and a machine.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
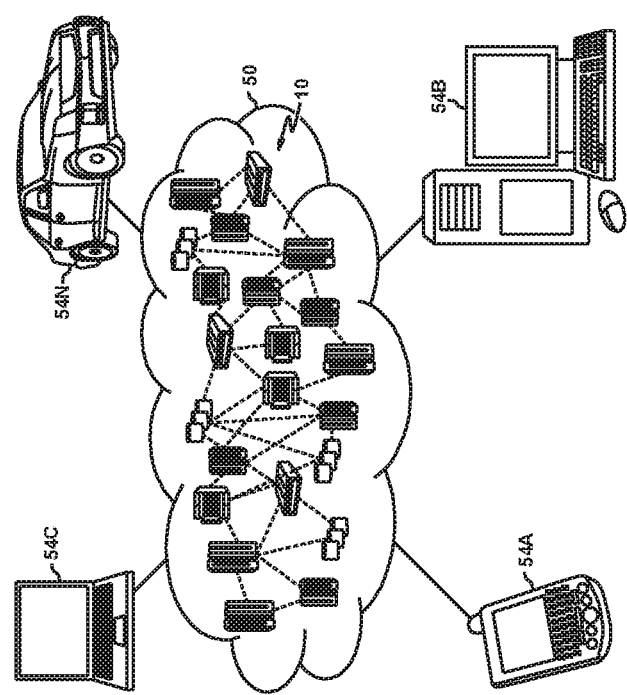
FIG. 1 depicts a cloud computing environment according to an embodiment of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

A technical challenge regarding typical cloud environments is the potentially unsecure and unwanted access to VM data and algorithms (e.g., by a cloud provider or cloud administrator). The cloud provider typically runs hypervisor code as the host with the customers' VMs as running as guests. This hypervisor code provides the virtualization function required to allow multiple VMs to run on a single physical machine. In existing systems, the hypervisor (and often by extension the cloud administrator) has access to customers' data and algorithms for situations where it must access limited portions of that data to provide a virtualization function. One virtualization example is the handling of I/O operations by the hypervisor. This is required due to the complexity of virtualizing I/O operations for a large number of virtualized guests. The first part of this virtualization begins when the guest issues the I/O instruction to initiate the request, e.g. I/O request x. This requires access by the hypervisor to the guest operands (both registers and storage) of the I/O instruction. In response to this instruction, the hypervisor updates the appropriate control block structures to track that request and initiates the I/O request in the hardware. Those control block structures may be used by hardware/firmware to present the associated I/O interrupt x directly to the guest, if it is dispatched. However, if while waiting for this I/O request to complete the guest enters the enabled wait state, since this guest is not doing any work, the hypervisor may dispatch another guest, which does have work to do, on the hardware. In order to do this, the hypervisor (with the help of hardware/firmware) monitors for when I/O interrupt x becomes pending and, when applicable from a virtualization perspective, presents it to the guest and re-dispatches the guest. In order to do this, the hypervisor updates the guest prefix page with the I/O interrupt information and updates the guest instruction address to point to the guest I/O interrupt handler before dispatching it. This requires access to both guest storage and the guest state (instruction address). In order to provide this and similar functions, the hypervisor typically has unlimited privilege to access the guest (VM) state and storage in the machine, which as described herein, can be insecure and untrusted and, therefore, undesired by the customer. However, the hypervisor can be a non-secure entity and the VM is a secure entity. In one or more examples, the secure entity can further include a virtual container or guest. In one or more examples, the non-secure entity can further include an operating system that is instantiated in the VM. The host 10 can also be deemed as a non-secure entity in one or more examples. One or more embodiments of the present invention, accordingly, provide for limiting the hypervisor's privilege, and yet facilitating completion of operations, such as in case of the I/O operation, to be handled by the hypervisor without granting access to secure guest facilities.

A virtual machine (VM), running as a guest under the control of a host hypervisor, relies on that hypervisor to transparently provide virtualization services for that guest. These services can include, but are not limited to memory management, instruction emulation, and interrupt processing. Technical solutions provided by one or more embodiments of the present invention can apply to any interface between a secure entity and another untrusted entity that traditionally allows access to the secure resources by this other entity. For example, for interrupt and exception emulation the hypervisor typically reads and/or writes into a prefix area (low core) of the guest. The term "virtual machine" or "VM" as used herein refers to a logical representation of a physical machine (computing device, processor, etc.) and its processing environment (operating system (OS), software resources, etc.) The virtual machine state is maintained by the hypervisor that executes on an underlying host machine (physical processor or set of processors). From the perspective of a user or software resource, the virtual machine appears to be its own independent physical machine. The terms "hypervisor" and "VM Monitor (VMM)" as used herein refer to a processing environment or platform service that manages and permits multiple VM's to execute using multiple (and sometimes different) OS's on a same host machine. It should be appreciated that deploying a VM includes an installation process of the VM and an activation (or starting) process of the VM. In another example, deploying a VM includes an activation (or starting) process of the VM (e.g., in case the VM is previously installed or already exists).

In presently available technical solutions, the hypervisor (e.g., z/VM® by IBM® or open source software Kernel Based Virtual machine (KVM)) dispatches a new VM virtual CPU (vCPU) on a physical processing unit, or host server, by issuing a Start-Interpretive-Execution (SIE) instruction which causes the SIE Entry millicode to be invoked. The operand of the SIE instruction is a control block, referred to as the state description (SD), which contains the guest state. In existing implementations, this state description resides in hypervisor storage. During SIE Entry, this guest state (including general purpose and control registers, guest instruction-address and guest program-status-word (PSW)) is loaded by millicode into the hardware. This allows the guest vCPU to run on the physical processor. While the vCPU is running on the hardware, the guest state is maintained in the hardware. At some point, the hardware/millicode must return control back to the hypervisor. This is often referred to as SIE Exit. This may be required, for example, if this vCPU executes an instruction which requires emulation by the hypervisor or if the vCPU time-slice (i.e., the time allocated for this vCPU to run on the physical processor) expires. During SIE Exit, since the hardware has resources to support only a single vCPU at any given time and it must now load the hypervisor state into the hardware, the millicode saves the current guest state in the state description. While this vCPU is not dispatched, its state is maintained in the state description. Since this state description lies within hypervisor storage, the hypervisor, in such cases, has control of the data for the VM, and in some cases such control is required to emulate instructions being executed on the VM. Existing hypervisors rely on using such an interface through the SIE instruction to dispatch vCPUs.

However, for facilitating secure guests, a technical challenge exists where the computer server, such as the hosting node, has to provide added security between the hypervisor and the secure guests, such that the hypervisor cannot access data from the VM, and hence, cannot provide services in the way described above.

Some instructions, for example input/output (I/O) operations, are delegated to the hypervisor. Accordingly, the hypervisor has to perform interpretation of those instructions, which in many cases can result in a guest exception (program interrupt), for example, when invalid parameters or operands are specified. This leads to the situation where only the hypervisor has knowledge of which parameters or operands are valid, while not being able to directly present exceptions (program interrupts) to the secure guest, that is, secure VM, so a new interface is provided which allows that interrupt to be injected by the hypervisor through the secure interface control into the guest. In addition, in some circumstances where the hypervisor is monitoring external or I/O interrupts on behalf of the secure VM, it also must be able to present external or I/O interrupts to the VM.

The secure execution described herein provides a hardware mechanism to guarantee isolation between secure storage and non-secure storage as well as between secure storage belonging to different secure users. For secure guests, additional security is provided between the "untrusted" non-secure hypervisor and the secure guests. In order to do this, many of the functions that the hypervisor typically does on behalf of the guests need to be incorporated into the machine. A new secure interface control is described herein to provide a secure interface between the hypervisor and the secure guests. The terms secure interface control and UV are used interchangeably herein. The secure interface control works in collaboration with the hardware to provide this additional security. In addition, a lower level hypervisor may be providing virtualization for this untrusted hypervisor and, if this lower level hypervisor is implemented in trusted code, it can also be part of the secure interface control.

The secure interface control, in one example, is implemented in internal, secure, and trusted hardware and/or firmware. For a secure guest or entity, the secure interface control provides the initialization and maintenance of the secure environment as well as the coordination of the dispatch of these secure entities on the hardware. While the secure guest is actively using data and it is resident in host storage, it is kept "in the clear" in secure storage. Secure guest storage can be accessed by that single secure guest—this being strictly enforced by the hardware. That is, the hardware prevents any non-secure entity (including the hypervisor or other non-secure guests) or different secure guest from accessing that data. In this example, the secure interface control runs as a trusted part of the lowest levels of firmware. The lowest level, or millicode, is really an extension of the hardware and is used to implement the complex instructions and functions defined for example in zAarchitecture® from IBM. Millicode has access to all parts of storage, which in the context of secure execution, includes its own secure UV storage, non-secure hypervisor storage, secure guest storage, and shared storage. The terms storage and memory are used interchangeably herein. This allows it to provide any function needed by the secure guest or by the hypervisor in support of that guest. The secure interface control also has direct access to the hardware which allows the hardware to efficiently provide security checks under the control of conditions established by the secure interface control.

One or more embodiments of the present invention address such technical challenges by providing a new interface which allows that interrupt to be injected by hardware or firmware into the VM. Further, one or more embodiments of the present invention provide such added security while still allowing the hypervisor to provide the services to the VM. This is done by incorporating functions or portions of functions that access secure guest facilities and that are typically done by the hypervisor on behalf of the guests into the new "secure interface control". The injection approach used by one or more embodiments of the present invention can apply to any interrupt types the hypervisor may need to inject. In one or more examples, such functionality can be provided by using millicode and/or other hardware modules, and in the present description are collectively referred to as being provided by the secure interface control. Millicode is trusted firmware which acts as an extension to the processor hardware. Accordingly, one or more embodiments of the present invention facilitate the hypervisor to securely and safely inject interrupts into the secure guest and to communicate through the secure interface control that an interrupt condition has occurred which must be handled by this guest.

A brief description of background technology now follows, after which, particular features used by one or more embodiments of the present invention for injecting interrupts and/or exceptions into secure VMs by a hypervisor are described. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
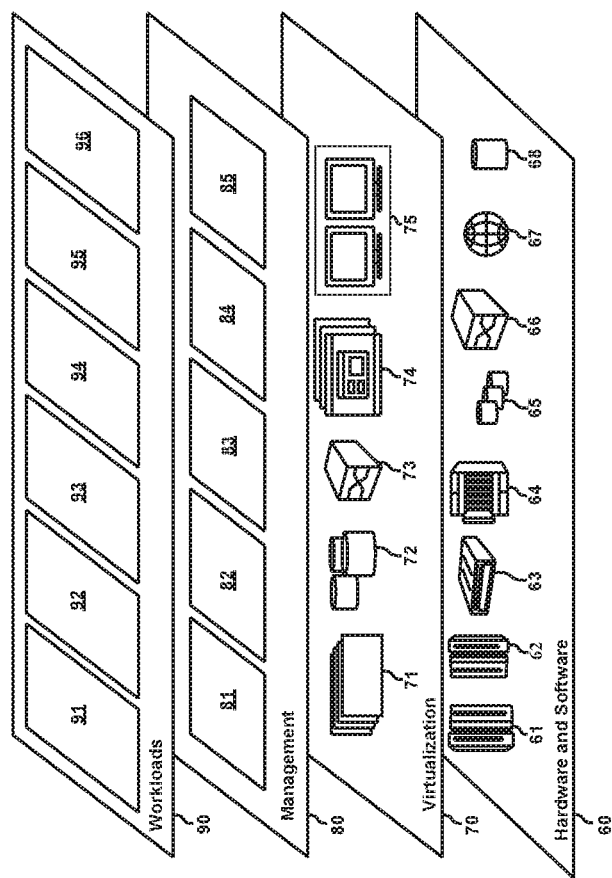
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual machines 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and source-code versioning 96. It is understood that these are just some examples and that in other embodiments, the layers can include different services.

Figure 3:
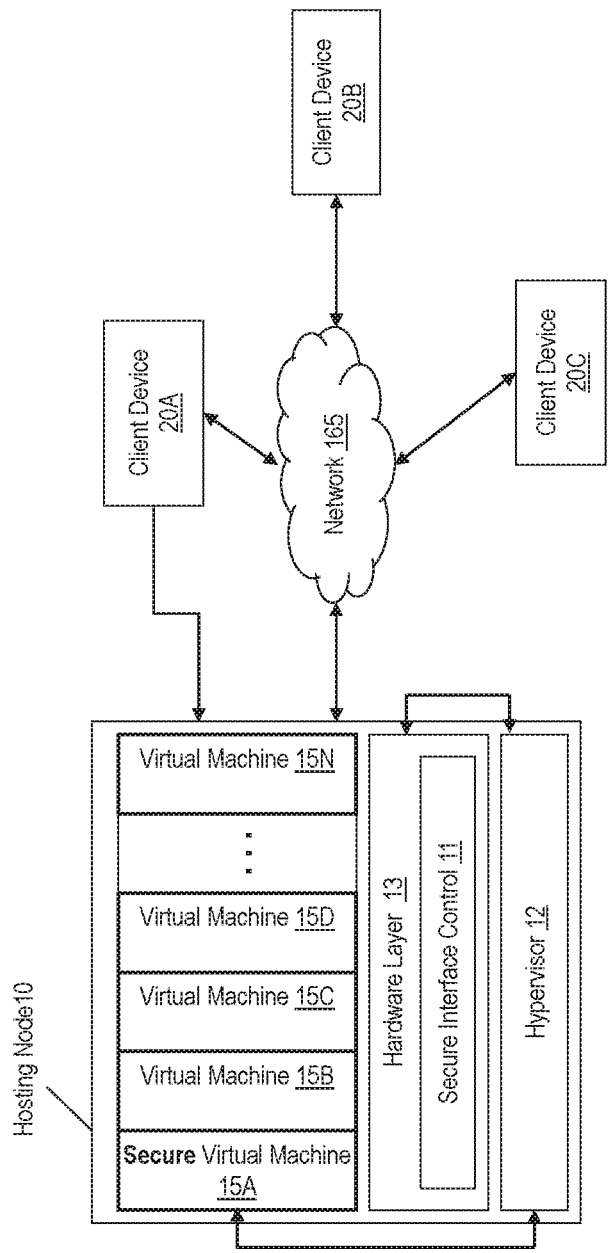
FIG. 3 illustrates an example system for hosting system, in accordance with an embodiment.

FIG. 3 illustrates an example hosting node 10 according to one or more embodiments of the present invention. The hosting node 10 is in direct or indirect communication with one or more client devices 20A-20C via a network 165. The hosting node 10 can be a datacenter or host server, of a cloud-computing provider. The hosting node 10 executes a hypervisor 12, which facilitates deploying one or more virtual machines 15 (15A-15N). The hosting node 10 further includes the hardware layer 13 that includes one or more hardware modules and millicode that facilitates the hypervisor 12 to provide one or more services to the virtual machines 15, including the secure interface control 11. In existing technical solutions, there are communications between hypervisor 12 and the hardware/millicode 13; the hardware/millicode 13 and one or more VMs 15; the hypervisor 12 and the one or more VMs 15; and the hypervisor 12 to VMs 15 through the hardware/millicode 13. To facilitate a secure VM environment, the hosting node 10 according to one or more embodiments of the present invention, does not include any direct communications between the hypervisor 12 and the one or more VMs 15 and instead provides communication through the secure interface control 11.

For example, the hosting node 10 can facilitate a client device 20A to deploy one or more of the virtual machines 15A-15N. The virtual machines 15A-15N may be deployed in response to respective requests from distinct client devices 20A-20C. For example, the virtual machine 15A may be deployed by the client device 20A, the virtual machine 15B may be deployed by the client device 20B, and the virtual machine 15C may be deployed by the client device 20C. The hosting node 10 may also facilitate a client to provision a physical server (without running as a virtual machine). The examples described herein embody the provisioning of resources in the hosting node 10 as part of a 'virtual machine,' however, the technical solutions described can be applied to provision the resources as part of a physical server.

In an example, the client devices 20A-20C may belong to the same entity, such as a person, a business, a government agency, a department within a company, or any other entity, and the hosting node 10 may be operated as a private cloud of the entity. In this case, the hosting node 10 solely hosts virtual machines 15A-15N that are deployed by the client devices 20A-20C that belong to the entity. In another example, the client devices 20A-20C may belong to distinct entities. For example, a first entity may own the client device 20A, while a second entity may own the client device 20B. In this case, the hosting node 10 may be operated as a public cloud that hosts virtual machines from different entities. For example, the virtual machines 15A-15N may be deployed in a shrouded manner in which the virtual machine 15A does not facilitate access to the virtual machine 15B. For example, the hosting node 10 may shroud the virtual machines 15A-15N using an IBM z Systems® Processor Resource/Systems Manager (PR/SM) Logical Partition (LPAR) feature. These features, such as PR/SM LPAR provide isolation between partitions, thus facilitating the hosting node 10 to deploy two or more virtual machines 15A-15N for different entities on the same physical hosting node 10 in different logical partitions.

A client device 20A from the client devices 20A-20C is a communication apparatus such as a computer, a smartphone, a tablet computer, a desktop computer, a laptop computer, a server computer, or any other communication apparatus that requests deployment of a virtual machine by the hypervisor 12 of the hosting node 10. The client device 20A may send a request for receipt by the hypervisor via the network 165 or directly. A virtual machine 15A, from the virtual machines 15A-15N is a virtual machine image that the hypervisor 12 deploys in response to a request from the client device 20A from the client devices 20A-20C. The hypervisor 12 is a virtual machine monitor (VMM), which may be software, firmware, or hardware that creates and runs virtual machines. The hypervisor 12 facilitates the virtual machine 15A to use the hardware components of the hosting node 10 to execute programs and/or store data. With the appropriate features and modifications the hypervisor 12 may be IBM z Systems®, ORACLE VM SERVER™, CITRIX XEN-SERVER™, VMWARE ESX™ MICROSOFT HYPER-V™, KVM, or any other hypervisor. The hypervisor 12 may be a native hypervisor executing on the hosting node 10 directly, or a hosted hypervisor executing on another hypervisor.

Figure 4:
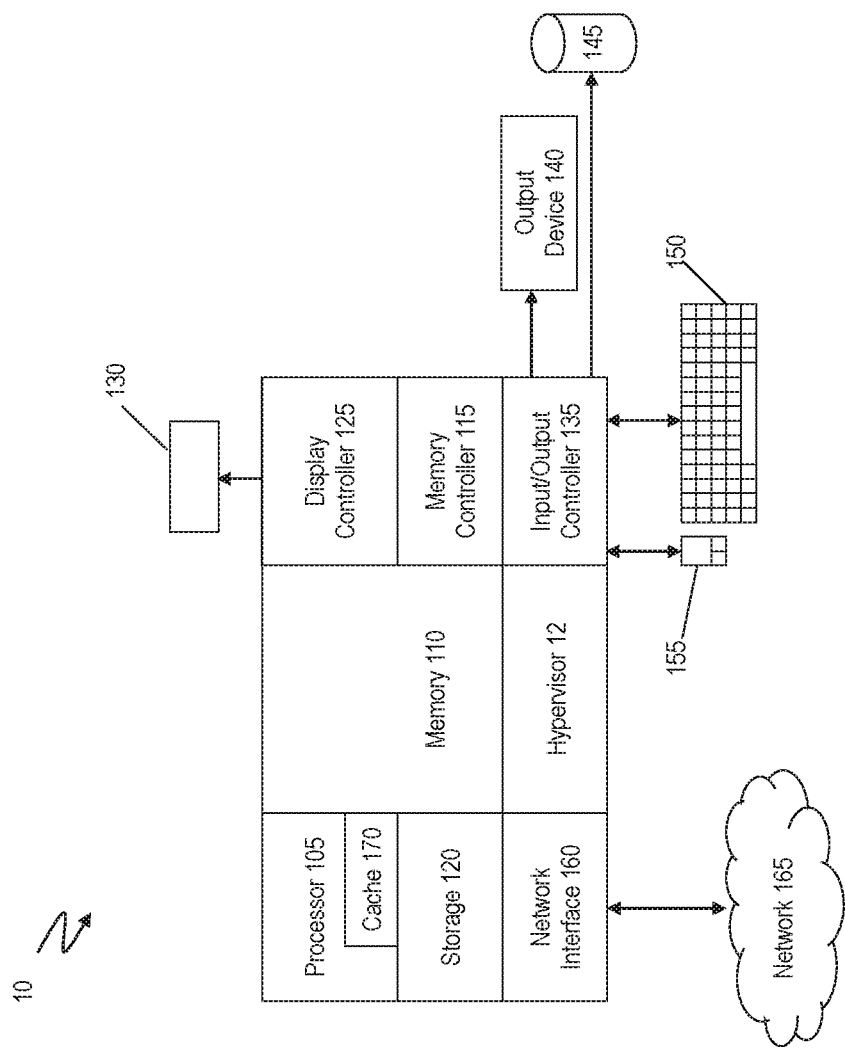
FIG. 4 illustrates an example block diagram of a hosting system, in accordance with an embodiment.

FIG. 4 illustrates components of an example hosting node according to one or more embodiments of the present invention. The hosting node 10 may be a computer, such as a server computer, a desktop computer, a tablet computer, a smartphone, or any other computer that executes the hypervisor 12, which in turn deploys the virtual machines 15A-15N. The hosting node 10 includes components that include hardware, such as electronic circuitry. The hosting node 10 includes, among other components, a processor 105, memory 110 coupled to a memory controller 115, and one or more input devices 145 and/or output devices 140, such as peripheral or control devices that are communicatively coupled via a local I/O controller 135. These devices 140 and 145 may include, for example, battery sensors, position sensors (altimeter 40, accelerometer 42, GPS 44), indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the hosting node 10, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 110 may include one or combinations of volatile memory elements (for example, random access memory, RAM, such as DRAM, SRAM, SDRAM) and nonvolatile memory elements (for example, flash memory, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS), which executes the hypervisor 12. The operating system may control the execution of other computer programs and provides scheduling, input-output control, file and data management, memory management, and communication control and related services. In an example, such as the z System™, a manufacturer of the hosting node 10 may provide the hypervisor 12. In the case of a system with a structure unlike that of z System, where the hypervisor 12 is not provided by the hardware manufacturer, the cloud computing provided may use a hypervisor 12 such as from VIVIWARE™, KVM, or other hypervisor providers. In an example, the administrator of the physical hosting node 10 is unable to modify the hypervisor 12, except when needed in order to apply service provided by the manufacturer. For example, the hypervisor 12 may be provided as part of a "Licensed Internal Code (LIC)" and/or microcode for the hosting node 10.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The hosting node 10 may further include a display controller 125 coupled to a user interface or display 130. In some embodiments, the display 130 may be an LCD screen. In other embodiments, the display 130 may include a plurality of LED status lights. In some embodiments, the hosting node 10 may further include a network interface 160 for coupling to a network 165. The network 165 may be an IP-based network for communication between the hosting node 10 and an external server, client and the like via a broadband connection. In an embodiment, the network 165 may be a satellite network. The network 165 transmits and receives data between the hosting node 10 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

The client device 20A may request the hypervisor 12 to deploy the corresponding virtual machine 15A with access to specific hardware and/or software components of the hosting node 10. For example, the client device 20A may request that the virtual machine 15A have access to a predetermined number of processors, a predetermined amount of volatile memory (such as random access memory (RAM)), a predetermined amount of non-volatile memory (such as storage space), or any other hardware components.

Alternatively or in addition, the client device 20A may request that the virtual machine 15A have access to specific hardware components such as electronic circuitry identified by corresponding unique identifier. For example, the client device 20A may request that the virtual machine 15A have access to a specific type of a processor, a co-processor, a network card, or any other chip or electronic circuitry. In an example, the client device 20A may identify the electronic circuitry using an identifier provided by a manufacturer of the electronic circuitry. In an example, the identifier may be used in conjunction with a version identifier. Alternatively or in addition, the client device 20A may request that the virtual machine 15A have access to specific software components such as an operating system, an application, a basic input/output system (BIOS), a boot image, or any other software component. The software components requested may include firmware and embedded programs in the hardware components of the hosting node 10. The client device 20A may identify the software components requested using respective unique identifiers provided by developers/manufacturers of the respective software components. In an example, the identifiers may be used in conjunction with version identifiers of the software components.

Figure 5:
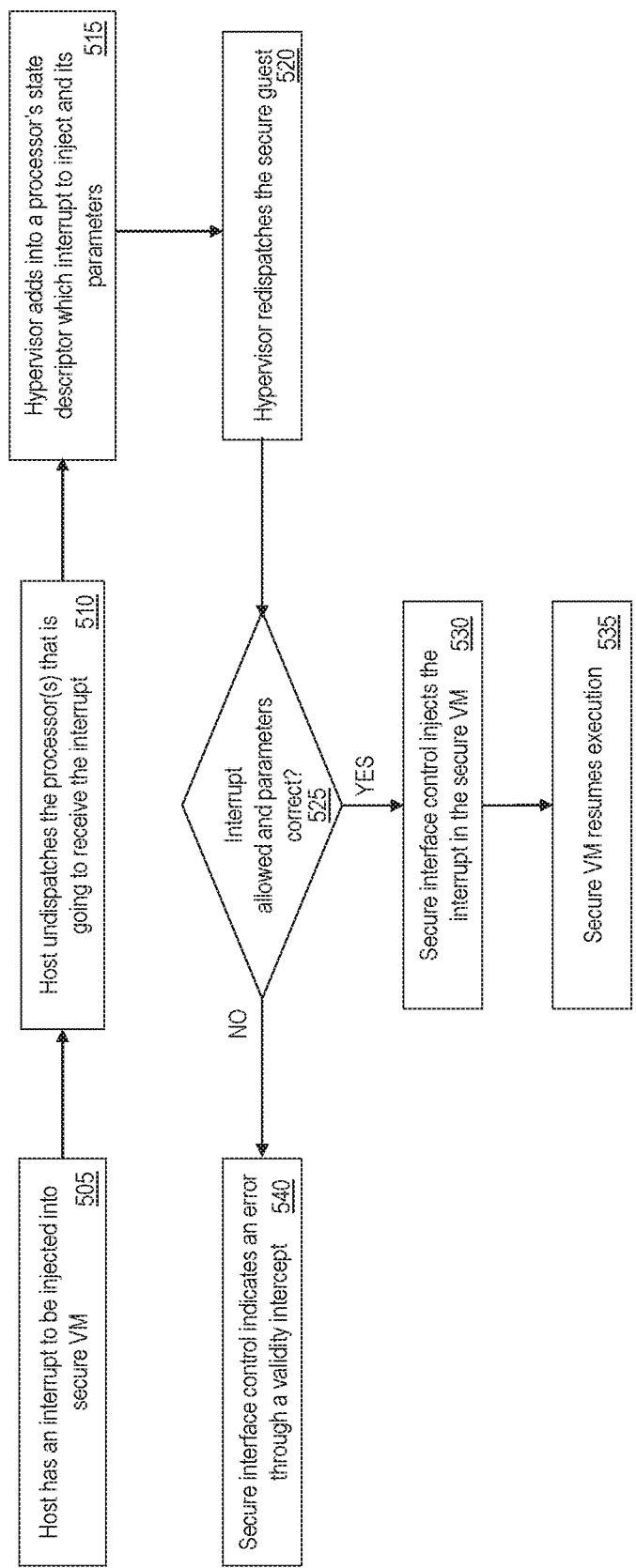
FIG. 5 illustrates a flowchart of an example method for a secure interface control to provide notification of interrupts to a secure VM according to one or more embodiments of the present invention.

FIG. 5 illustrates a flowchart of an example method for the hypervisor, through the secure interface control, to provide notification of interrupts to the secure VM according to one or more embodiments of the present invention. The method includes dispatching the secure VM 15A vCPUs and allocating a processor(s) 105 and other computing resources to the secure VM 15A by execution of a SIE (Start interpretive Execution) instruction. The SIE instruction puts the processor 105 into an emulation state defined in a control block in the memory 110 that is generally referred to as a state descriptor (SD). Typically, the SIE instruction has one operand which addresses the SD. That is, the SD contains fields which define the hardware state to be emulated on the processor(s) 105 as may be requested by a client device 20 for the secure VM 15A. The processors 105 can be considered virtual processors in one or more examples because the processor 105 can be instructed to emulate the behaviour of another processor architecture at the request of the client 20 that initiated the secure VM 15A.

In accordance with one or more embodiments of the present invention, the SD fields include: (1) an origin field containing an absolute memory address at which the secure VM's (i.e. guest's) real address zero is assigned, which locates the guest's page zero, (2) fields for the current PSW (program status word) of the secure VM 15A, (3) save areas for the general registers (GRs) and control registers (CRs) of the secure VM 15A, and (4) miscellaneous other fields for other guest states.

The method includes the host 10 determining that an interrupt should be injected and creating that interrupt so that it can be injected into the secure VM 15A, at 505. The interrupt can be an I/O, external interrupt, or any other type of interrupt. As noted earlier, the hypervisor 12 does not have direct access to the memory, registers, or any other data of the secure VM 15A, preventing the hypervisor 12 from directly injecting the interrupt into the secure VM 15A as can be done in existing technical solutions by saving the guest interrupt information directly into the VM prefix page and loading the interrupt new PSW into the current VM state, i.e., SD, before re-dispatching.

The virtual processor(s) of the secure VM 15A that are to receive the interrupt are undispatched by the host 10, if needed, at 510. Further, the hypervisor 12 adds the interrupt that is to be injected and one or more parameters associated with the interrupt into the SD of the virtual processor(s), at 515. In one or more examples, this addition may instead be performed by the hypervisor 12 issuing an injection instruction in a typical manner, which is implemented by the secure interface control. Upon identifying the instruction being requested by the hypervisor 12, the secure interface control can either inject the interrupt condition into the secure VM 15A or securely add the interrupt information into the associated SD(s) for processing at the next dispatch. The hypervisor 12 further resumes the operation of the processor 105 assigned to the secure VM 15A by redispatching the secure virtual machine, at 520.

At this time, when the hypervisor 12 redispatches the virtual processor for the secure VM 15A, during the SIE entry to redispatch this vCPU the secure interface control 11 checks if the injected interrupt and its parameters are valid and if the processor 105 is enabled for the type of interrupt being injected, at 525. When the secure VM 15A is initiated, the client 20 or a default setting can provide a list of interrupts that the secure VM 15A can receive. In one or more examples, particular types of interrupts, e.g., I/O interrupts may be restricted from reaching the secure VM 15A, for example, for security reasons. In addition, one or more types of parameters associated with the I/O interrupts can be restricted from reaching the secure VM 15A. For example, parameters that include text, memory pointers, or scripts to be executed by the secure VM 15A, or any other types of parameters can be restricted. In one or more examples, the secure interface control 11 has access to a list of interrupt types and/or parameter types that are restricted (or allowed) for the secure VM 15A. For example, such a list can be stored in the secure portion of memory allocated to the secure interface control 11. In one or more examples, different lists can apply to different secure VMs.

If the validation of the interrupt type and the parameter types is successful, the secure interface control 11 injects the interrupt into the secure VM 15A and the execution of the secure VM 15A resumes, at 530 and 535. The secure interface control 11 injects the interrupt by adding the information for the interrupt and the corresponding parameters to the memory (prefix page) and registers of the secure VM 15A. Further, the secure VM 15A execution resumes with the interrupt being raised, at 535.

In the case of improper values of the interrupt and/or the parameters being validated by the secure interface control 11, the secure interface control 11 indicates an error, for example via a validity intercept to the hypervisor 12, and the execution of the secure VM 15A is not resumed, at 540. The secure interface control 11 or the hypervisor 12 upon receiving the validity intercept can raise the alarm indicative of a possible security breach as described herein.

Accordingly, the method described above facilitates the hypervisor 12 to inject an interrupt into a secure VM 15A, when the hypervisor 12 does not have direct access to the memory/register space associated with the secure VM 15A.

Further, one or more embodiments of the present invention facilitate the secure VM 15A to cause interrupts or program exceptions to be raised in the hypervisor 12.

A technical challenge exists when the secure VM 15A executes a program instruction, for example, as part of an operation being performed by an application executing in the secure VM 15A, and if the program instruction requires interception to the hypervisor 12. The hypervisor 12, as part of the emulation of that guest program instruction, determines there is a guest exception associated with the program instruction but is unable to access any of the registers/memory associated with the secure VM 15A which are necessary to present the exception to the VM. One or more embodiments of the present invention described herein facilitate to inject the exception into the VM 15A.

Figure 6:
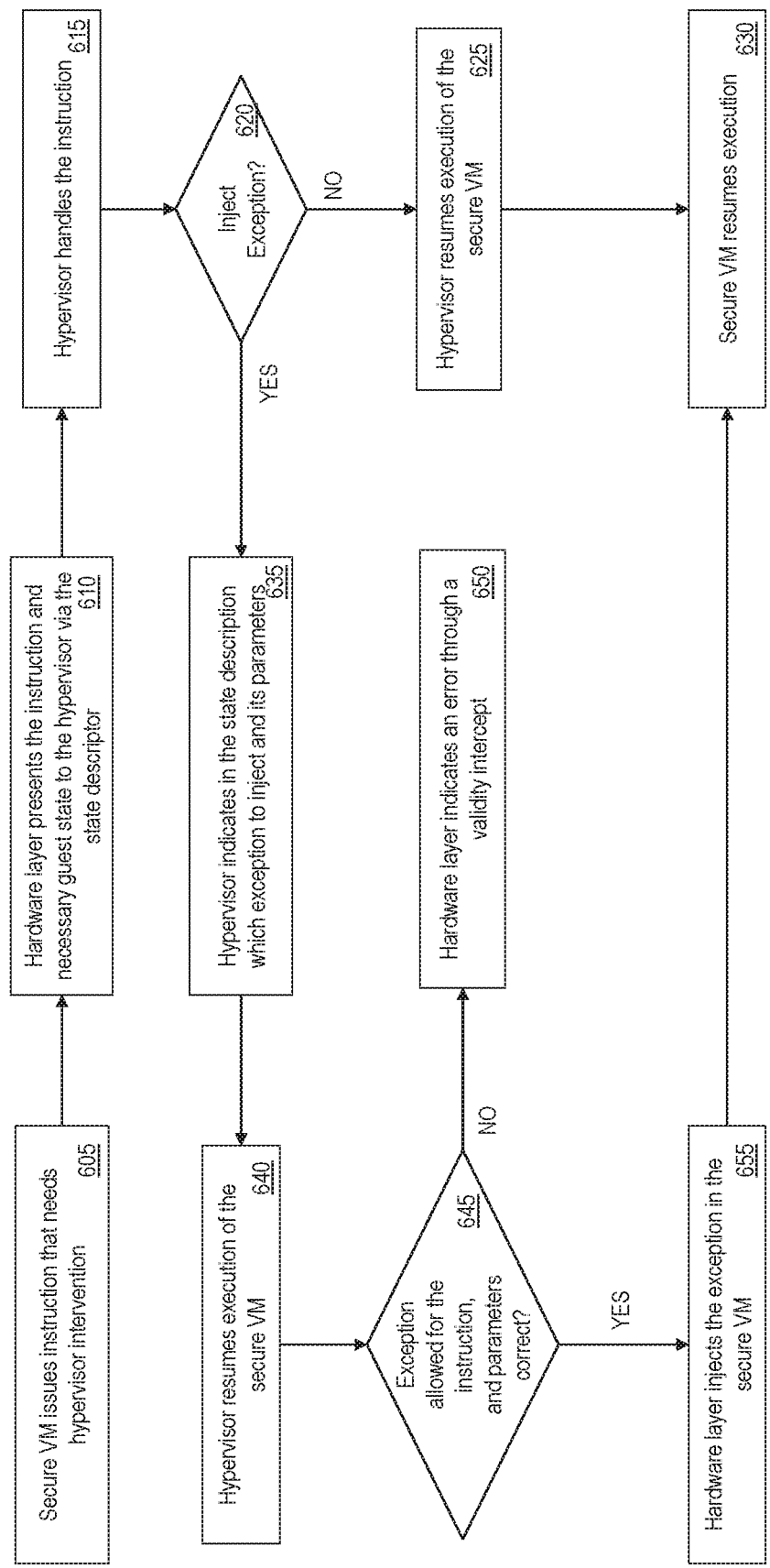
FIG. 6 illustrates a flowchart of an example method for a secure VM to raise an exception in a non-secure entity according to one or more embodiments of the present invention.

FIG. 6 illustrates a flowchart of an example method for the hypervisor to raise an exception in the secure VM in response to emulation of a guest instruction according to one or more embodiments of the present invention. The method includes the secure VM 15A issuing an instruction that requires hypervisor intervention, at 605. For example, the instruction can be a request for an I/O channel of the host 10, an instruction which enables for asynchronous interrupts, or any other such instruction that requires the hypervisor 12 to service.

Instead, in one or more embodiments of the present invention, the secure interface control 11 presents the instruction and other limited guest state information to the hypervisor 12, e.g., via the state descriptor, at 610. In one or more examples, the hardware or secure interface control identifies that the instruction that is being executed by the secure VM 15A requires intervention by the hypervisor, and in response, intercepts the instruction. That is, it stops execution of the instruction by the VM and saves the current guest state in secure storage. The secure interface control 11 securely exposes the part of the guest state required for instruction emulation, such as the operand and opcode to the hypervisor 12, for example, by copying the information into the state descriptor and begins executing the hypervisor code that handles guest interceptions. It should be noted that the instruction is accordingly passed for the hypervisor 12 to execute without any context from the secure VM 15A. The secure interface control 11 identifies the instruction that is to be intercepted based on a list of predetermined instructions (or types of instructions) that are to be intercepted in this manner. The hypervisor 12 emulates the instruction, at 615.

The hypervisor 12 determines if an exception was encountered during the emulation of the instruction, at 620. If an exception was not encountered, the hypervisor 12 resumes execution of the secure VM 15A, at 625. The secure VM 15A accordingly resumes operation using the guest state according to the state descriptor associated with the secure VM 15A, at 630.

Instead, if an exception was encountered during the emulation of the guest instruction, the hypervisor 12 determines which exception is to be presented to the secure VM 15A, at 635. The hypervisor 12, accordingly, includes information about the exception that is to be reported to the secure VM 15A, for example, in the state descriptor. The information can include an identifier of the exception to be reported along with one or more parameters corresponding to the exception that is to be reported. In one or more examples, the reported exception can be different than the exception that was actually encountered during the execution of the instruction. The hypervisor 12, upon completing the state descriptor update, redispatches the secure VM 15A using the SIE instruction, at 640. Alternatively, the hypervisor 12 may invoke the secure interface control 11 via an instruction to indicate that an exception should be presented to the secure VM 15A at the next dispatch and the secure interface control can make the appropriate update to the state descriptor or similar control block.

During SIE Entry, the secure interface control 11 checks the state descriptor of the secure VM 15A and identifies the exception information that was added by the hypervisor 12. The secure interface control 11 determines whether to pass the exception to the secure VM 15A, at 645. The secure interface control 11 makes the determination based on a list of exceptions that are allowed to be passed to the secure VM 15A. The list of exceptions can be specific to the secure VM 15A, and can be a predetermined list or a list provided by the client that initiated the secure VM 15A, and the like.

In addition, in one or more examples, the secure interface control 11 checks if the exception being passed to the secure VM 15A is appropriate based on the instruction that was passed to the hypervisor 12 for execution. For example, the secure interface control 11 can have a list of guest instructions that can be intercepted to the hypervisor 12 and, for each instruction, have a set of one or more exceptions that can be passed back to the secure VM 15A by the hypervisor 12. If the exception being passed is not from the set of exceptions corresponding to the instruction that was being executed by the secure VM 15A, the secure interface control 11 indicates an error through, for example, a validity intercept by raising an alarm as described herein, at 650.

Further yet, the secure interface control 11 determines the propriety of the exception being passed to the secure VM 15A by checking the parameters that are being passed with the exception, at 645. If the parameters do not match the one or more allowed parameter types, the secure interface control 11 raises an error condition or alarm, at 650.

Instead, if the exception and the parameters being passed to the secure VM 15A, by the hypervisor 12, are valid, the secure interface control 11 injects the exception into the secure VM 15A, at 655. Injecting the exception into the secure VM 15A includes, for example, changing one or more register values and memory (low core) values of the secure VM 15A that indicates to the operating system of the VM 15A that an exception has occurred. The secure VM execution is further resumed, at 630. The resumption includes the secure VM 15A handling the exception that has been raised because of the instruction that was being executed prior to the being intercepted.

Accordingly, one or more embodiments of the present invention facilitate injecting exceptions into the secure VM 15A by the hypervisor 12.

According to one or more embodiments of the present invention a computer server can host secure VMs that prohibit a hypervisor from accessing memory, registers, and other data associated with the secure VMs, without having to change the hypervisor and/or the secure VM code/architecture to inject interrupts into the hypervisor and/or to inject exceptions into the secure VMs. Instead, according to one or more embodiments of the present invention a secure interface control that includes millicode, facilitates such injections using a state descriptor and secure portion of the storage/memory to communicate the interrupt/exception information. In addition, the secure interface control performs validity checks on the interrupt/exception information to prevent malicious information being passed between the secure VMs and the hypervisor, and continuing to maintain security of the secure VM in this manner.

One or more embodiments of the present invention are rooted in computer technology, particularly virtual machine hosting computer servers. Further, one or more embodiments of the present invention facilitate an improvement to the operation of computing technology itself, in particular virtual machine hosting computer servers, by facilitating the hosting computer servers to host secure VMs, in which even the hypervisor is prohibited from accessing memory, registers, and other such data associated with the secure VM. In addition, one or more embodiments of the present invention provide significant steps towards the improvements of the VM hosting computing servers by using a hardware layer and/or secure interface control that includes millicode to facilitate a separation of the secure VM and the hypervisor, and thus maintaining a security of the VMs hosted by the computing server. The hardware layer provides lightweight intermediate operations to facilitate the security, without adding substantial overhead to injecting the interrupts and/exceptions as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method comprising:
    initiating, by a non-secure entity comprising a hypervisor that is executing on a host server, a secure entity comprising a secure virtual machine, the non-secure entity prohibited from directly accessing any data of the secure entity;
    issuing, by the secure virtual machine, an instruction that requires hypervisor intervention;
    intercepting the instruction by a secure interface control of the host server by stopping execution of the instruction and saving a current guest state of the secure virtual machine in secure storage of the host server, wherein the secure interface control comprises secure and trusted hardware, secure and trusted firmware, or a combination of both the secure and trusted hardware and the secure and trusted firmware, wherein the secure interface control runs on a lowest level of firmware of the host server, and wherein the secure interface control provides initialization and maintenance of secure environments on the host server and coordinates the dispatch of the secure entity on hardware of the host server;
    exposing, by the secure interface control, only that portion of the current guest state which is required for instruction emulation to the hypervisor and passing the instruction to the hypervisor to execute without any context from the secure virtual machine;
    determining, by the hypervisor, that an exception was encountered during the emulation of the instruction;
    determining, by the secure interface control, whether to pass the exception to the secure virtual machine based in part on exception information provided by the hypervisor; and
    in response to determining to pass the exception, injecting, by the secure interface control of the host server, the exception into the secure entity, the non-secure entity being unable to provide direct communication, including the exception, to the secure entity.

2. The computer implemented method of claim 1, wherein the secure and trusted firmware comprises millicode having access to all parts of storage.

3. The computer implemented method of claim 1, further comprising:
    prior to the injecting, determining, by the secure interface control, whether the exception is permitted to be injected into the secure entity, wherein the injecting is performed based on determining that the exception is permitted to be injected into the secure entity.

4. The computer implemented method of claim 3, wherein the secure interface control determines that the exception is permitted to be injected into the secure entity based on a predetermined list of permissible exceptions for the secure entity.

5. The computer implemented method of claim 4, wherein the list of permissible exceptions is specific to said secure entity.

6. The computer implemented method of claim 3, wherein the method further includes, in response to determining that the exception is not permitted to be injected into the secure entity, indicating an error to the non-secure entity by the secure interface control.

7. The computer implemented method of claim 1, further comprising: prior to the injecting, determining, by the secure interface control, whether the exception and one or more parameters are permitted to be injected into the secure entity, wherein the injecting is performed based on determining that the exception and the one or more parameters are permitted to be injected into the secure entity.

8. The computer implemented method of claim 1, wherein adding the information about the exception comprises one of:
    storing, by the non-secure entity, the information about the exception into a state descriptor associated with the secure entity; and
    issuing, by the non-secure entity, an instruction for the secure control interface to store the information about the exception into a state descriptor associated with the secure entity.

9. A system comprising:
    a memory;
    a secure interface control comprising secure and trusted hardware, secure and trusted firmware, or a combination of both the secure and trusted hardware and the secure and trusted firmware, wherein the secure interface control runs on a lowest level of firmware of a host server, and wherein the secure interface control provides initialization and maintenance of secure environments on the host server and coordinates the dispatch of one or more secure entities on hardware of the host server; and
    a processing unit coupled with the memory and the secure interface control, the processing unit configured to execute a non-secure entity that hosts the one or more secure entities including a secure entity comprising a secure virtual machine, the non-secure entity comprising a hypervisor prohibited from directly accessing any data of a secure entity, and wherein a method to inject an exception into the secure entity comprises:
    issuing, by the secure virtual machine, an instruction that requires hypervisor intervention;
    intercepting the instruction by the secure interface control by stopping execution of the instruction and saving a current guest state of the secure virtual machine in secure storage of the host server;
    exposing, by the secure interface control, only that portion of the current guest state which is required for instruction emulation to the hypervisor and passing the instruction to the hypervisor to execute without any context from the secure virtual machine;
    determining, by the hypervisor, that an exception was encountered during the emulation of the instruction;
    determining, by the secure interface control, whether to pass the exception to the secure virtual machine based in part on exception information provided by the hypervisor; and
    in response to determining to pass the exception, injecting, by the secure interface control, the exception into the secure entity, the non-secure entity being unable to provide direct communication, including the exception, to the secure entity.

10. A computer program product comprising a computer readable storage medium, the computer readable storage medium comprising computer executable instructions, which when executing by a processing unit causes the processing unit to perform a method comprising:
   initiating, by a non-secure entity comprising a hypervisor that is executing on a host server, a secure entity comprising a secure virtual machine, the non-secure entity prohibited from directly accessing any data of the secure entity;
   issuing, by the secure virtual machine, an instruction that requires hypervisor intervention;
   intercepting the instruction by a secure interface control of the host server by stopping execution of the instruction and saving a current guest state of the secure virtual machine in secure storage of the host server, wherein the secure interface control comprises secure and trusted hardware, secure and trusted firmware, or a combination of both the secure and trusted hardware and the secure and trusted firmware, wherein the secure interface control runs on a lowest level of firmware of the host server, and wherein the secure interface control provides initialization and maintenance of secure environments on the host server and coordinates the dispatch of the secure entity on hardware of the host server;
   exposing, by the secure interface control, only that portion of the current guest state which is required for instruction emulation to the hypervisor and passing the instruction to the hypervisor to execute without any context from the secure virtual machine;
   determining, by the hypervisor, that an exception was encountered during the emulation of the instruction;
   determining, by the secure interface control, whether to pass the exception to the secure virtual machine based in part on exception information provided by the hypervisor; and
   in response to determining to pass the exception, injecting, by the secure interface control, the exception into the secure entity, the non-secure entity being unable to provide direct communication, including the exception, to the secure entity.

11. The computer program product of claim 10, wherein the method further comprises:
   prior to injecting by the non-secure entity, undispatching a processor associated with the secure entity.

12. The computer program product of claim 11, wherein the secure interface control determines that the exception is permitted to be injected into the secure entity based on a predetermined list of permissible exceptions for the secure entity.

13. The computer program product of claim 11, wherein the method further comprises:
   after adding the information about the exception by the non-secure entity, redispatching a virtual processor to resume operation of the secure entity.

14. The computer program product of claim 10, wherein the information about the exception comprises an identifier for the exception to be injected and one or more parameters associated with the exception.

* * * * *